Dec. 23, 1958   B. F. A. LANE ET AL   2,865,721
CATALYTIC BED ASSEMBLIES
Filed Dec. 13, 1955

INVENTORS
BERNARD F. A. LANE
PHILIP RAMSDEN.

BY Watson, Cole, Grindle & Watson ATTORNEYS

United States Patent Office 2,865,721
Patented Dec. 23, 1958

2,865,721

CATALYTIC BED ASSEMBLIES

Bernard Frederick Adams Lane, Clophill, and Philip Ramsden, Luton, England, assignors to D. Napier & Son Limited, London, England, a British company Application December 13, 1955, Serial No. 552,929

Claims priority, application Great Britain December 15, 1954

2 Claims. (Cl. 23—288)

This invention relates to catalytic bed assemblies of the kind in which the bed causes reaction in a fluid which is caused to flow through the bed, and is particularly but not exclusively applicable to beds for decomposing liquids, particularly hydrogen peroxide, the decomposition products of which are used for example as the working fluid of a turbine or the like or of a rocket or other jet propulsion device.

A common form of catalytic bed assembly for the purpose referred to comprises a reaction chamber having an inlet passage for the fluid at one end and an outlet passage for the products of reaction at the other end the casing containing a closely packed stack of gauzes formed of or coated with a catalyst metal and constituting the bed proper, and the present invention aims at providing a catalytic bed in which reaction will tend to be more readily and completely effected than in beds of the above kind and which will tend to have a relatively long working life.

A catalytic bed assembly for decomposing fluids, more particularly, but not exclusively, hydrogen peroxide, according to the present invention comprises a reaction chamber having an inlet passage for the fluid at one end and an outlet passage for the products of reaction at its other end, and a catalytic bed within the chamber comprising a quantity of pellets formed of or coated with the catalyst metal and closely packed within the end of the chamber adjacent to the inlet passage, and a stack of gauzes formed of or coated with the catalyst metal extending across and substantially filling the part of the chamber adjacent to the outlet passage.

Where the catalytic bed is intended to decompose hydrogen peroxide the pellets will preferably be formed of sintered silver, with or without a small proportion of some other metal such as copper, while the gauzes will either be formed of silver or plated or coated with silver, which in the latter case will preferably have been applied by means of a hot metal spray as described for example in the specification of the present applicants' United States patent application No. 403,598, now Patent No. 2,809,940.

In one example the closely packed pellets of catalytic metal may extend to a point not more than about half-way between the inlet and outlet ends of the chamber while the remainder of the chamber is filled with the catalytic gauzes.

It has been found that a catalytic bed formed of pellets, particularly if these pellets be formed of sintered metal, provides a highly active catalytic bed capable of retaining its effectiveness for long periods provided that the pellets at no time become overheated.

It has moreover been found that in many cases, if a complete catalytic bed of small dimensions but adequate effectiveness be composed entirely of sintered metallic pellets, the rear part of the bed, that is to say the part through which the fluid passes last, tends to reach such a high temperature due to the reaction therein and to the heat of the products of reaction passing therethrough that the pellets tend to become sintered together and thus to form a mass offering a high resistance to flow therethrough and giving inadequate surface area.

The invention thus provides the advantage of the high catalytic activity of the pellets adjacent to the inlet end of the bed together with the necessary total length of catalytic bed to ensure reaction without an excessively large bed, while avoiding the risk of the efficiency and satisfactory operation of the bed breaking down due to pellets becoming excessively heated and sintering together.

The invention may be performed in various ways, and one particular form of catalytic bed assembly suitable for decomposing hydrogen peroxide will now be specifically described by way of example with reference to the accompanying drawings, in which.

Figure 1:
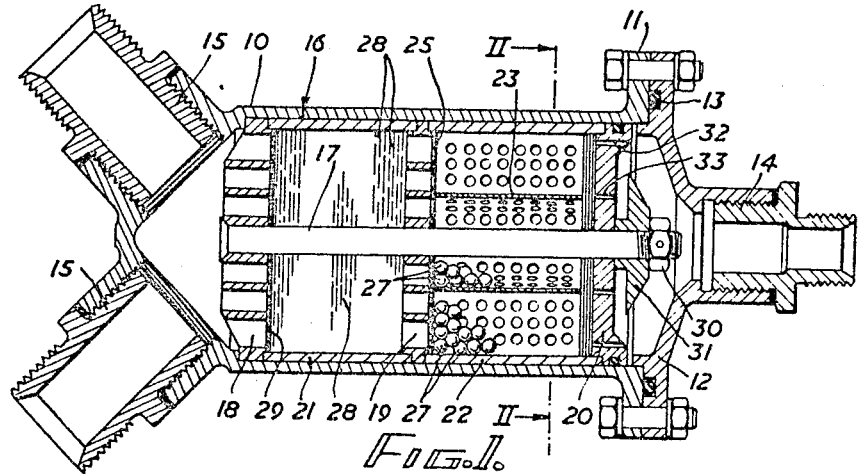
Figure 1 is a longitudinal section through the catalytic bed assembly.
Figure 2:
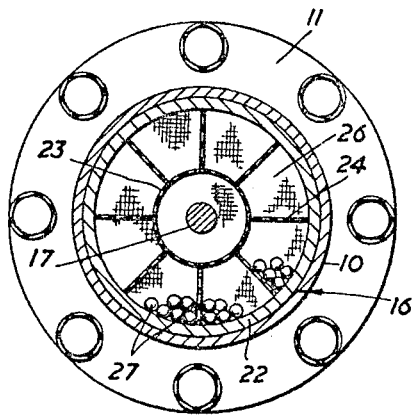
Figure 2 is a cross-section taken on the line II—II in Figure 1.

The catalytic bed assembly shown in the drawings consists of a cylindrical outer casing 10 having at one end a flange 11 to which is bolted a cover 12 provided with a resilient sealing ring 13 which makes a pressure-tight joint. An inlet 14 for hydrogen peroxide is provided in the centre of the cover 12. The other end of the casing is provided with two similar reaction product outlets 15.

Within the outer casing 10 is a sub-assembly 16 containing the catalytic bed. The sub-assembly 16 consists of a central rod 17 secured at one end to a grid 18 and provided with an intermediate grid 19 and a distributor plate 20 at its other end. Between the grids 18 and 19 there is a sleeve 21, while between the grid 19 and the distributor plate 20 there is another sleeve 22.

In the zone between the distributor plate 20 and the intermediate grid 19 there is a partition assembly comprising a perforated cylindrical wall 23 and several radially extending perforated flat partition walls 24. Against the intermediate grid 19 there is a supporting gauze 25, while against the downstream surface of the distributor plate 20 there is a thin wad of inert gauzes 26.

The compartments defined by the partitions 23 and 24 are tightly packed with pellets 27 of which only a few are shown. These pellets preferably consist of sintered silver powder mixed with a small proportion, say 7%, of copper powder, and are anodised and ammoniated. The silver powder may have a particle diameter of between 0.007" and 0.010", for instance, while the copper powder may be such as will pass through a 300 mesh sieve. The pellets may each be, say, 3 mm. diameter and 1.5 mm. thickness with convex opposite faces having a radius of curvature of between 4 mm. and 6 mm.

The perforations in the partitions 23 and 24 are of such a size that while they permit hydrogen peroxide to pass freely between the compartments they retain the pellets in their respective compartments. The effect of these partitions is to prevent any tendency for the flow of hydrogen peroxide to compact the pellets in one part of the pellet-filled zone while leaving other parts of this zone less densely packed.

The zone between the grids 18 and 19 is packed with a stack of annular gauzes 28 made of silver. Against the grid 18 there is a single gauze 29 of heavier gauze material which supports the outermost of the gauzes 25.

Each of the gauzes 28 may be, for instance, of 20 mesh gauze formed from 28 S. W. G. copper wire coated with silver by metal spraying as described in the aforementioned United States patent application No. 403,598.

The sub-assembly 16 is clamped up tightly by means of a nut 30 screwed on to the rod 17, this nut pressing against a baffle plate 31 which bears against the distributor plate 20.

The distributor plate 20 is provided with two rings of apertures, an outer ring 32 and an inner ring 33. The periphery of the baffle plate 24 extends to a radius intermediate between the radii of these rings of apertures, to distribute the incoming flow of hydrogen peroxide substantially uniformly amongst the apertures.

As the hydrogen peroxide is forced through the catalyst bed it progressively decomposes exothermically to produce a hot mixture of steam and oxygen which issues through the outlets 15. In the pellet-containing zone the hydrogen peroxide is only partially decomposed and the temperatures and flow velocities are still relatively low, whereas in the gauze-filled zone the reaction proceeds to completion and the temperatures and flow velocities are relatively high.

What we claim as our invention and desire to secure by Letters Patent is:

1. A catalytic bed assembly for decomposing fluids comprising a reaction chamber, an inlet for said fluid at one end of said reaction chamber, an outlet for products of reaction at the other end of said reaction chamber, said outlet being of substantially greater cross sectional area than said inlet, and a catalytic bed within said reaction chamber comprising a quantity of pellets consisting essentially of silver closely packed within said reaction chamber in a zone adjacent said inlet and a stack of silver coated gauzes packed within said reaction chamber in a zone adjacent said outlet.

2. A catalytic bed assembly according to claim 1 which includes longitudinal essentially radial partitions in the zone of said reaction chamber containing said pellets, said partitions sub-dividing said zone into longitudinal pellet-containing compartments, and said partitions being perforated with perforations of a size which permit said fluid to pass through said partitions between adjacent pellet-containing compartments but retain said pellets in their respective compartments.

References Cited in the file of this patent

UNITED STATES PATENTS

| | | |
|---|---|---|
| 1,814,796 | Grebe | July 14, 1931 |
| 2,077,563 | Henry | Apr. 20, 1937 |
| 2,317,449 | Flock | Apr. 27, 1943 |
| 2,327,045 | Huff | Aug. 17, 1943 |
| 2,404,574 | Hammond | July 23, 1946 |
| 2,646,391 | Houdry | July 21, 1953 |
| 2,721,788 | Schad | Oct. 25, 1955 |

OTHER REFERENCES

Mellor: "Comprehensive Treatise on Inorganic and Theoretical Chemistry," 1925, vol. 6, pages 288 and 289.